(12) United States Patent
Kuo et al.

(10) Patent No.: US 9,912,017 B1
(45) Date of Patent: Mar. 6, 2018

(54) APPARATUS AND METHOD FOR INTELLIGENT BATTERY OPTIMIZATION AND EQUALIZATION MANAGEMENT SYSTEM

(71) Applicants: Ho-Hsun David Kuo, Peoria, AZ (US); Bingxin Zhao, Long Beach, CA (US); Xiang Meng, Shanghai (CN)

(72) Inventors: Ho-Hsun David Kuo, Peoria, AZ (US); Bingxin Zhao, Long Beach, CA (US); Xiang Meng, Shanghai (CN)

( * ) Notice: Subject to any disclaimer, the term of this patent is extended or adjusted under 35 U.S.C. 154(b) by 197 days.

(21) Appl. No.: 14/842,346

(22) Filed: Sep. 1, 2015

Related U.S. Application Data

(60) Provisional application No. 62/045,109, filed on Sep. 3, 2014, provisional application No. 62/139,732, filed on Mar. 29, 2015.

(51) Int. Cl.
*H02J 7/00* (2006.01)
*H01M 10/46* (2006.01)
*H01M 10/42* (2006.01)

(52) U.S. Cl.
CPC ....... *H01M 10/46* (2013.01); *H01M 10/4257* (2013.01); *H02J 7/0014* (2013.01); *H02J 7/0021* (2013.01); *H01M 2010/4271* (2013.01)

(58) Field of Classification Search
USPC ......................................... 320/112
See application file for complete search history.

(56) References Cited

U.S. PATENT DOCUMENTS

| | | | | |
|---|---|---|---|---|
| 2008/0086247 A1* | 4/2008 | Gu | ........................ | H02J 7/0022 701/36 |
| 2009/0027009 A1* | 1/2009 | Sivertsen | ............ | B60L 11/1866 320/134 |
| 2010/0052615 A1* | 3/2010 | Loncarevic | ........... | H02J 7/0016 320/118 |
| 2013/0271072 A1* | 10/2013 | Lee | .................... | H01M 10/4207 320/108 |
| 2014/0347013 A1* | 11/2014 | Kim | ................... | G01R 31/3606 320/134 |

\* cited by examiner

*Primary Examiner* — Mohammed Alam (57) ABSTRACT

An intelligent battery optimization management and equalization system that also monitors all cells within a battery. The system will ensure all cells are charged to maximum capacity, discharges the full capacity of each cell, perform equalization of charges between all the cells, manages and monitors each cell within a battery pack.

13 Claims, 6 Drawing Sheets

APPARATUS AND METHOD FOR
INTELLIGENT BATTERY OPTIMIZATION
AND EQUALIZATION MANAGEMENT
SYSTEM

CROSS REFERENCE

This application is a Non-provisional patent application of and claims priority to U.S. Provisional Patent Application No. 62/045,109 filed 3 Sep. 2014, and claims priority to U.S. Provisional Patent Application No. 62/139,732 filed 29 Mar. 2015, the specification(s) of which is/are incorporated herein in their entirety by reference.

FIELD OF THE INVENTION

The invention relates to a system for battery charging, discharging, equalization and management, and a method for its implementation.

BACKGROUND OF THE INVENTION

A battery is made up of a group of battery cells (referred to as cells). The cells are grouped together in series or in parallel or a combination of both to provide the current and voltage specifications needed to create the battery. The performance of the battery depends on the performance of these cells.

Due to the current manufacturing technology and process, cells from the same assembly line, produced one after another, will not have the exact same specifications or performance. There will always be minor differences. When cells are grouped together, the performance is limited by the weakest cell. The performance of the cells will also deteriorates with age, since the worst cell in a battery deteriorates from a lower starting point than the other cells, it renders the battery obsolete as soon as one cell is near the end of its functional life.

When a battery is being charged, all cells are receiving electrical current and charging at the same time. As soon as one cell has reached its maximum capacity, the charging process will stop for all cells. This happens regardless of the status of the other cells. After a battery is charged, each individual cell is at different capacities from one another. As cells age, the lowest performance cell dominants the performance, the capacity will decrease, resulting in a significant decrease in its capacity to hold a charge.

When a battery is discharging, all cells are discharging at the same time. As soon as one cell is depleted, discharging will stop no matter the capacity of the other cells. This causes a battery to be non-functional even if other cells are still at full or still capable of discharging. A fully charged battery will indicate full charge when tested, that is because the measurement is performed across all cells, within the cells there could be bad cells at lower capacity. With age, the cell performance will decrease and the battery will need to be charged more often and hold less charge.

It would be desirable to have an intelligent battery optimization, equalization management system capable of monitoring all battery cells within a battery, ensuring balanced charge/discharge of each cell and performing equalization of charges between all the cells. It would be also desirable to apply such an intelligent battery optimization, equalization management system in various fields such as but not limited to electric vehicle charging.

SUMMARY OF THE INVENTION

Embodiments of the invention relate to a battery optimization, equalization management system to extend the life of a battery pack and its application for in various fields such as but not limited to residential, commercial, industrial, recreational and electric vehicle charging.

The present invention is an apparatus and solution to charge, discharge, optimize and extend the life of a battery pack. The systems, devices and methods are described for use with battery packs. Embodiments optimize charging, discharging, equalizing the battery cells, provides management, prevents overcharging, under-discharging, and overheating. Embodiments allow for full charge and discharge of battery packs without overheating, over-charging and under-discharging of the individual battery cells. This enables the full potential of each battery cell, and the battery pack.

The apparatus is designed to act and be a battery management system that not just monitors but also increases the performance of the battery. During the charge cycle, the apparatus monitors each battery cell to ensure each battery cell is charged to its maximum potential at the same time monitoring the battery cell temperature to prevent over temperature situations. This increases the safety when charging the battery and also increase the amount of power stored in each battery cell.

During any time when the battery is idle and also during discharging, the apparatus performs equalization to ensure each individual cell is at the same level at one another. This equalization cycle ensures the battery cell will perform at its maximum potential, at the same time increase the battery life. The cell temperatures are also monitored, when an over temperature situation occurs, the apparatus stops that particular battery cell from doing any functions and give it time to cool down. This shutdown of a particular battery cell due to over temperature decreases the output of the battery but does not stop the battery from functioning. In a situation where more and more battery cells are overheating, the apparatus shuts down the battery for safety and allow the battery cells to cool down before resuming normal operations.

The present invention provides the ability to monitor each battery cell, charge each battery to its maximum potential and discharge each battery cell to provide the maximum battery life. In addition to increase the performance of a battery pack, this invention also improves the safety and decrease the chance of battery fires.

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

One skilled in the art will recognize that various implementations and embodiments may be practiced in line with the specification. All of these implementations and embodiments are intended to be included within the scope of the invention.

DETAILED DESCRIPTION OF THE PREFERRED EMBODIMENTS

In the following description, for the purpose of explanation, specific details are set forth in order to provide an understanding of the present invention. The present invention may, however, be practiced without some or all of these details. The embodiments of the present invention described below may be incorporated into a number of different means, components, circuits, devices, and systems. Devices shown in block diagram are illustrative of exemplary embodiments of the present invention. Connections between components or devices within the figures are not intended to be limited to direct connections. Instead, connections between components may be modified, re-formatted via intermediary components.

When the specification makes reference to "one embodiment" or to "an embodiment", it is intended to mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

Various embodiments of the invention are used for a battery optimization, equalization management system to extend the life of a battery pack and its application for in various fields such as but not limited to residential, commercial, industrial, recreational and electric vehicle charging.

Figure 1:
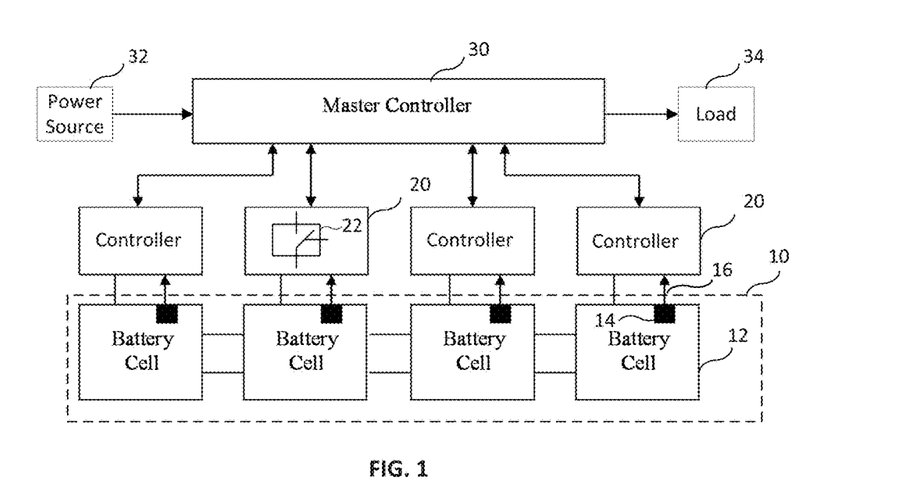
FIG. 1 is an exemplary block diagram of an illustrative battery optimization, equalization management system (BOEMS) for a rechargeable battery pack in accordance with an embodiment of the present invention.

FIG. 1 shows an exemplary block diagram of an illustrative battery optimization, equalization management system (BOEMS) for a rechargeable battery pack in accordance with an embodiment of the present invention. The battery pack 10, includes a plurality battery cells 12, with each battery cell couples to a dedicated battery cell controller (and monitor) 20. The plurality battery cells 12 may be connected together in series, parallel or a combination of series/parallel connection to form the battery pack 10. The battery cells 12 may be a Lithium battery cell, Lithium-ion battery cell, Lithium polymer battery cell, electrolytic battery cell, electrochemical battery cell or any energy storage device. In some embodiments, the individual rechargeable battery cell 12 is a cell package comprising multiple battery elements.

A master controller 30 couples to all the battery cell controllers 20. In one embodiment, the master controller 30 couples to a power source 32 for battery charging. The master controller 30 may also couple to a load 34 to provide energy (battery discharging). The master controller 30 controls all charging, discharging, optimizing, protect and equalizing functions of the battery pack.

In one embodiment, the battery cell 12 may have a cell sensor 14, which measures at least one parameter of the battery cell 12 and sends the measured at least one parameter to corresponding cell controller 20. The cell sensor 14 may be a voltage sensor measuring voltage cross the cell, a current sensor measuring current through the cell, a temperature sensor measuring the cell temperature during operation, or a combination of multiple sensors. The cell controller 20 receives the at least one parameter from the cell sensor 14 and sends the information to the master controller 30, which makes controls of charging, discharging, optimizing, and equalizing functions for all the battery cells 12 via the cell controller 20 based at least on the at least one parameter from the each cell sensor 14. In an alternative embodiment, the cell controller 20 may also make controls of charging, discharging, optimizing, and equalizing functions for all the battery cells 12 in various situations, such as when the master controller 30 does not provide controls to the cell controller 20 over a predetermined time period, or when the master controller 30 sends an error message to the cell controller 20, etc.

In one embodiment, the cell controller 20 comprise a controllable switch 22, which is configured to receive controls from the master controller 30 to electrically engage/disengage the corresponding battery cell 12 from the power source 32 or the load 34 for the control of battery cell charging/discharging. The controllable switch 22 may be a semiconductor switch (such as a SCR or a thyristor switch) or a relay controlled switch. The battery cell 12 maybe any type of rechargeable battery cell, such as an electrochemical battery cell, a lithium battery cell, a super capacitor cell, etc.

The battery cell controller 20 couples between the battery cell 12 and the master controller 30. The battery cell controller 20 provides information of each individual battery cell 12, such as voltage, current and temperature, to the master controller 30.

The master controller 30 collects all information received from the battery cell controller and provides control signals to each battery cell controller 20 for engagement/disengagement of each corresponding battery cell 12. The engagement/disengagement of each corresponding battery cell 12 may be parallel, independent from each other or in a certain order. In some embodiments, the master controller 30 may also provide the collected information to a requestor for additional local or remote monitoring/controlling.

In some embodiments, all the battery cell controllers 20 and the master controller 30 are integrated together into a single controlling component. This will reduce cost for the hardware and also simplify installation.

Figure 2:
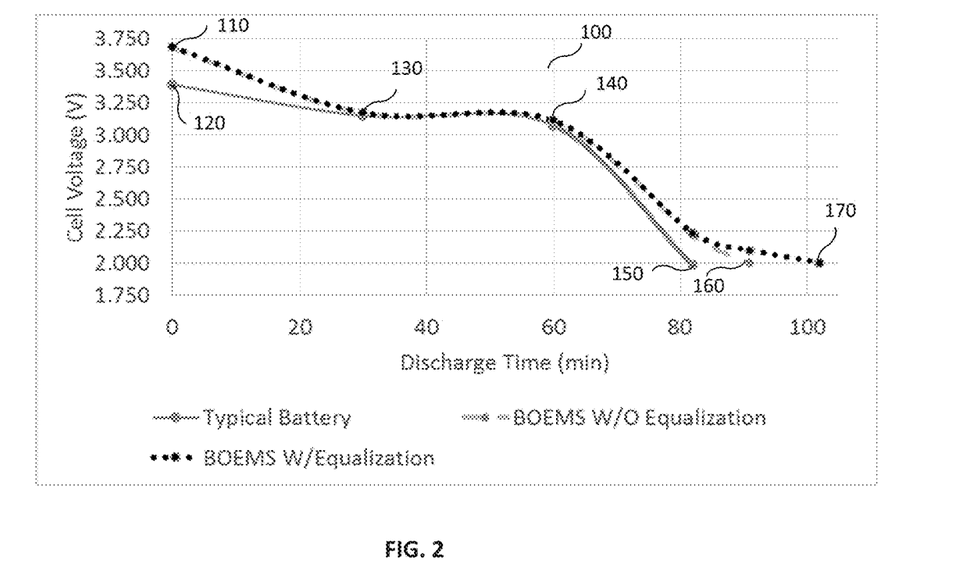
FIG. 2 shows an illustrative discharge characteristic curve for an exemplary 3.7-volt lithium ion cell at 25° C., compared with the same cells with BOEMS and BOEMS with equalization.

FIG. 2 shows an illustrative discharge characteristic curve for an exemplary 3.7-volt lithium ion pack with multiple cells at 25° C., compared with the same pack with BOEMS and BOEMS with equalization 100. As shown, the fully charged battery pack without BOEMS is fully charged at around 3.4V 120. The battery pack with BOEMS are fully charged at 3.7V 110. The present invention is capable of optimizing the battery pack to be charged to its maximum potential at 3.7V. As the battery pack discharges, the operating voltage drops to around 3.2V 130, where it remains constant for most of the discharge cycle. Near the end of the discharge cycle 140, the operating voltage of the battery pack drops sharply until the minimum operational voltage is reached and the battery stops discharging 150. The battery with the BOEMS, but without equalization is able to discharge further, offering an 11% increase in discharge time 160. Utilizing the BOEM to its full capability with battery cell equalization, the discharge time has increased by 24% 170. As a battery ages, the performance will drop, and the improvements with BOEMS will be greater.

Figure 3:
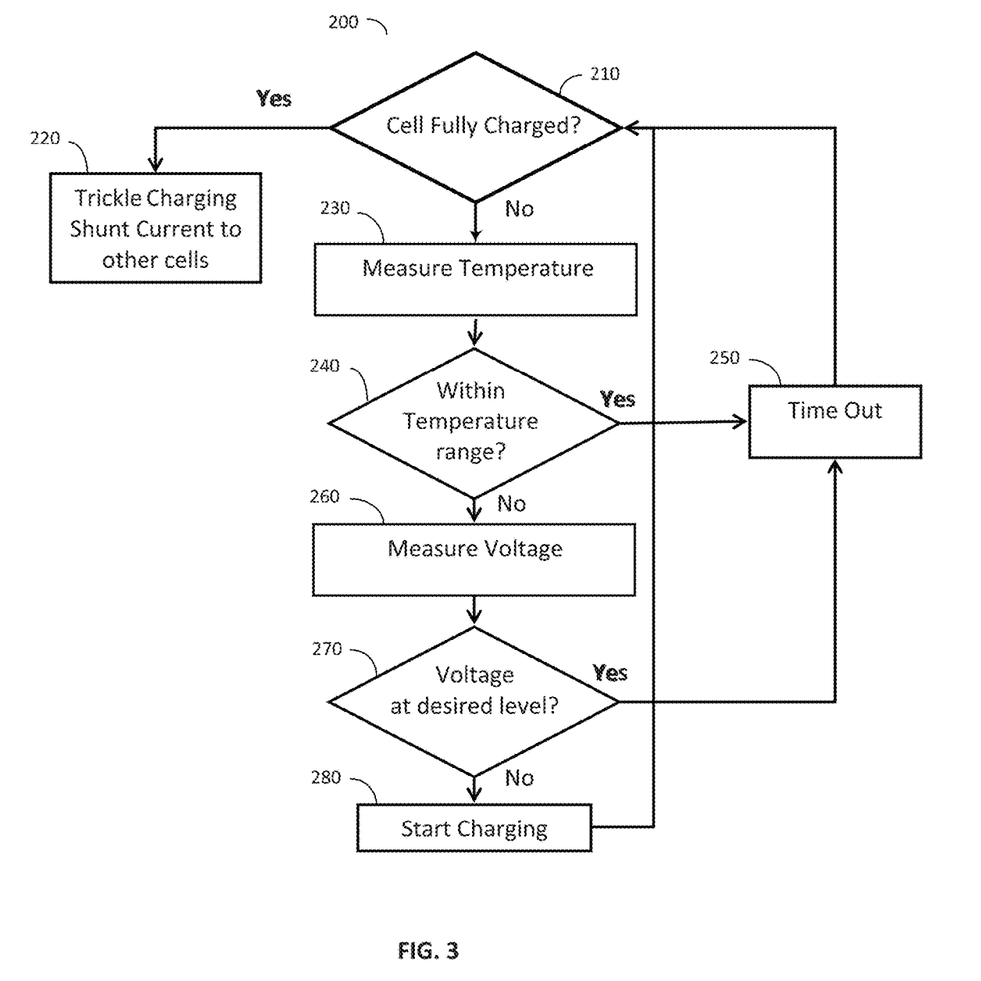
FIG. 3 shows an illustrative flow diagram for controlled charging of a battery pack in accordance with an embodiment of the present invention.

FIG. 3 shows a flow diagram of an illustrative embodiment of a method 200 for controlled charging of a battery cell 12 of a battery pack 10 of the present invention. The controlled charging method 200 for a battery cell 12 starts at step 210 by making measurements and checking if the battery cell 12 is at full capacity. If the battery cell 12 is determined to be at full capacity, then trickle charging for this battery cell 12 will be initiated at step 220 to keep the battery cell 12 at full capacity while waiting for other battery cells to reach maximum potential. Charging current is shunt away from this battery cell 12, to decrease charging time for other battery cells. In one embodiment, the trickle charging may be implemented by controlling the ON/OFF duty cycle of the controllable switch 22 for a desired trickle charging current. Current shunting may also be implemented by switching OFF the corresponding controllable switch 22 related to the battery cell 12.

If the battery cell 12 is not fully charged, a measurement of the temperature of the battery cell 12 is taken at step 230. The temperature measurement is compared to a preset temperature range at step 240 to determine if an over or under temperature situation is occurring. If an over or under temperature is determined, the temperature is considered to not be within the temperature range the battery cell 12 is be place in time out and stops charging 250, with pre-determined time settings then repeat the process at 210 making measurements on the voltage charge of the battery cell 12. If the temperature 230 of the battery cell 12 is within acceptable range, the voltage 260 across the battery cell 12 is measured.

The voltage across the battery cell 12 is measured in step 260 and compared to a preset voltage range between an upper limit and a lower limit (with the upper limit higher than or equal to the lower limit) in step 270 to determine if the measured voltage is at a desired maximum capacity level. If the maximum capacity level is reached, then the battery cell 12 is placed in time out mode (stop charging) in step 250. After a pre-determined time interval setting, the process is repeated at step 210 to make measurements on the charge of the battery cell 12. If the measured voltage is lower than the lower limit, then charging starts again in step 280. Charging 280 will resume for a pre-set amount of time, then will restart the process back at 210 making measurements on the charge of the battery cell 12.

This method 200 resumes until all battery cells within the battery pack 10 are fully charged and under trickle charging status in step 220. In some embodiment, the method 200 may also be initiated where temperature of battery cell 12 is constantly monitored and compared to the preset temperature range.

Figure 4:
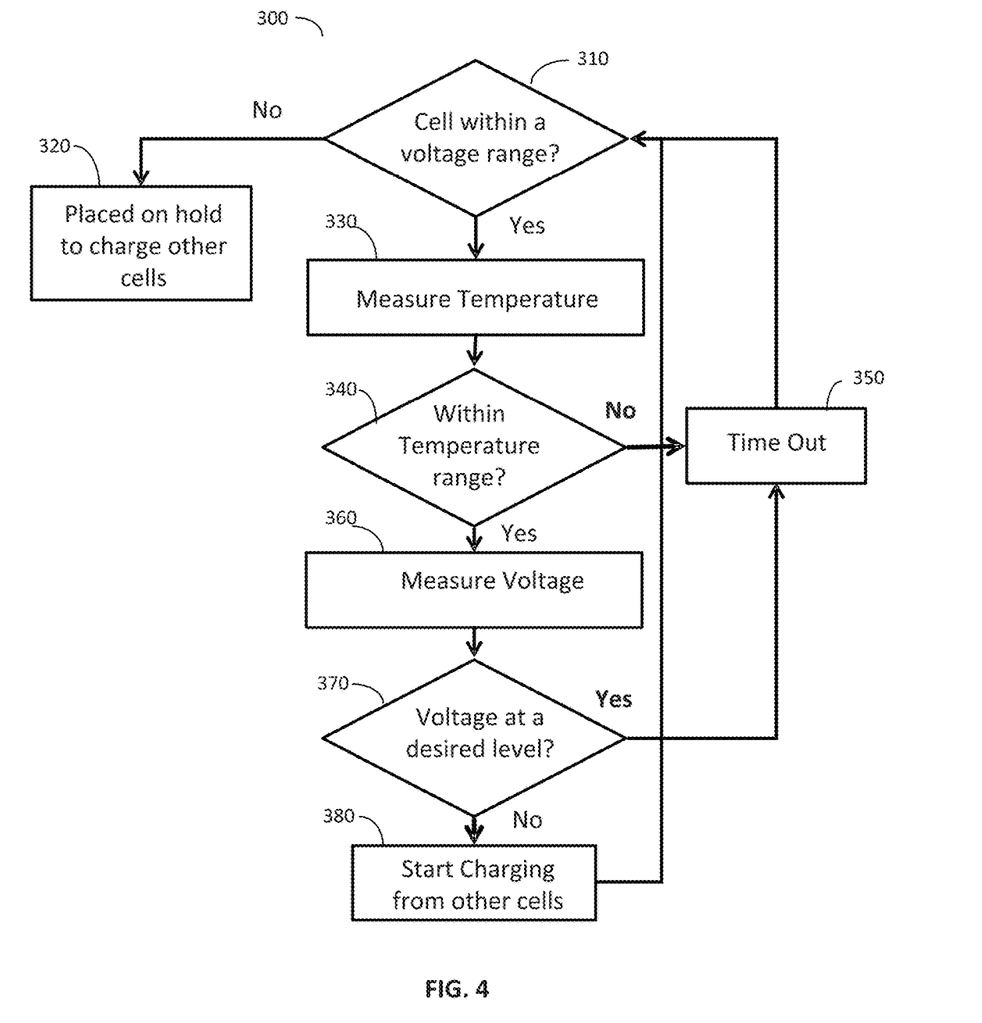
FIG. 4 shows an illustrative flow diagram for controlled equalization of a battery pack in accordance with an embodiment of the present invention.

FIG. 4 shows a flow diagram of an illustrative embodiment of a method 300 for controlled equalization of battery cells 12 of a battery pack 10 of the present invention, when no charger is connected. Equalization utilizes the variance in stored energy in each battery cell 12 to charge each other to reach equalization among battery cells and is constantly in operation to maintain the equalization among all battery cell voltage values. The method 300 starts at step 310 by making measurements and checking whether the battery cells 12 are within the preset voltage range of one another. If a battery cell 12 is determined to be over voltage (above an upper limit of the preset voltage range), the battery cell 12 is placed on hold for a preset time while waiting for other cells to equalize and to be used to charge other battery cells 12.

If the battery cell 12 is within the voltage range, a measurement of the battery cell temperature is taken at step 330. The measured temperature is compared to a preset temperature range at step 340 to determine whether an over or under temperature situation is occurring, the temperature is considered to not be within the temperature range. If the temperature is not within the preset temperature range, the battery cell 12 is place in time out mode and stops charging (if charging was initiated) in step 350. After a pre-determined time interval, the process is repeated at step 310 making measurements on the voltage of the battery cell 12. If the temperature of the battery cell 12 is within an acceptable range, the voltage across the battery cell 12 is measured in step 360.

The voltage across the battery cell 12 is compared to an average battery cell voltage value in step 370 to determine whether the voltage the battery cell 12 is at the desired equalization level. The average battery cell voltage value is calculated based on measured voltage values from all battery cells. If the equalization level is reached, then the battery cell 12 will be placed in time out mode and stops charging (if charging was initiated) in step 350. After a pre-determined time interval, the process is repeated at step 310 to make measurements again on the charge of the battery cell 12. If the measured battery cell voltage is lower than the average battery cell voltage values, the battery cell 12 starts charging process in step 380. After a pre-set amount of charging time, the process goes back to step 310 for another round of measurements on the battery cell 12.

After all battery cells 12 are fully equalized, the process goes on hold in step 320. In one embodiment, this method 300 may utilize the situation when the charger is still connected but all battery cells 12 are in trickle charging status 220 to further ensure each battery cell 12 has reached equalization among battery cells 12 and is constantly in operation to maintain the equalization among all battery cell voltage values.

In some embodiment, the method 300 may also be operated only during a desired time period. This method 300 may also be initiated with temperature of the battery cells being constantly monitored and compared to a preset temperature range.

Figure 5:
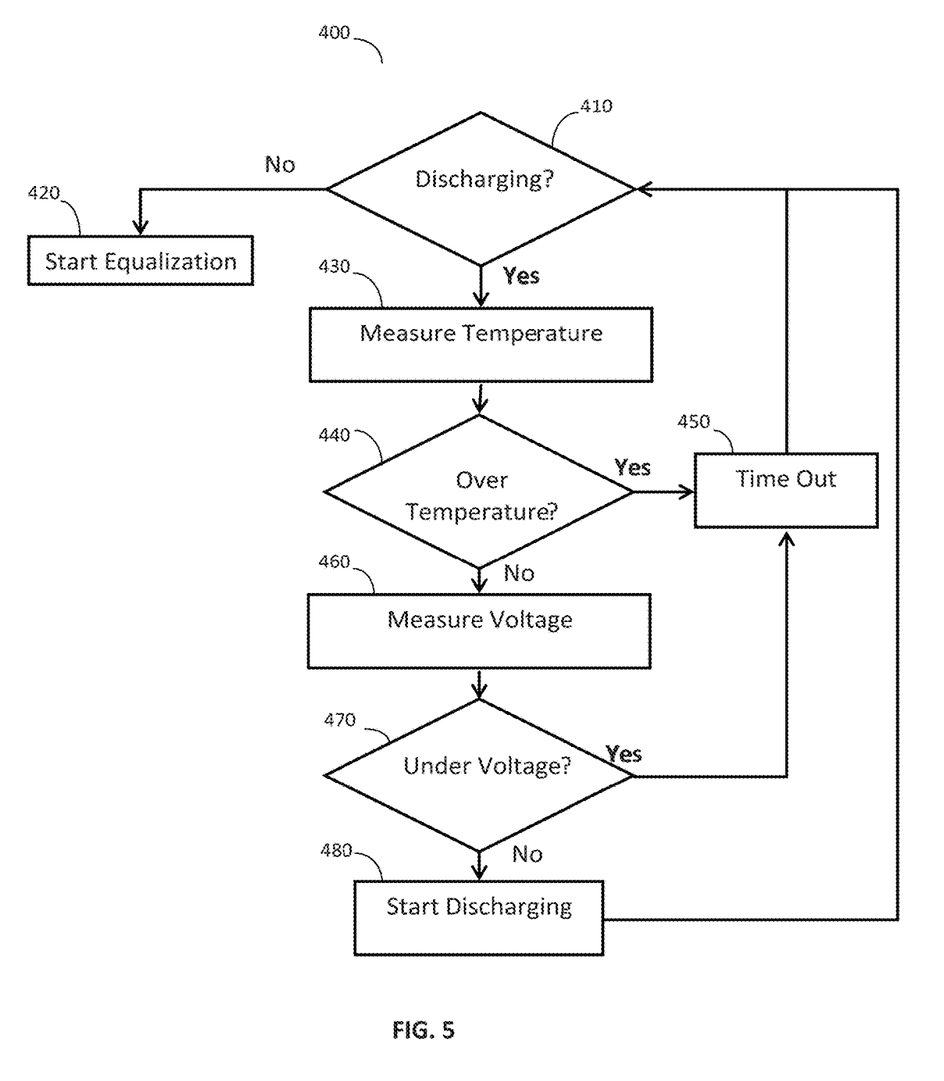
FIG. 5 shows an illustrative flow diagram for controlled discharging of a battery pack in accordance with an embodiment of the present invention.

FIG. 5 shows a flow diagram of an illustrative embodiment of a method 400 for controlled discharging of a battery cell 12 of a battery pack 10 of the present invention. The method 400 starts at step 410 by checking if there is a load and the battery cell 12 is to be discharging. If the battery cell 12 is determined to be not discharging or not needed to be discharging, then process goes to step 420 for equalization as described in FIG. 4.

If the battery cell 12 is to be discharging, a measurement of the battery cell 12 temperature is taken at step 430. The measured temperature is compared to a preset temperature range at step 440 to determine if an over or under temperature situation is occurring. If an over or under temperature is determined, the temperature is considered to not be within the temperature range, the battery cell 12 is placed in time out mode and stops discharging (if discharging was initiated) at step 450. After a pre-determined time interval, the process is repeated at step 410 to check whether the battery cell 12 is ready for discharging. If the temperature of the battery cell 12 is within the preset temperature range, the voltage across the battery cell 12 is measured at step 460.

The measured voltage across the battery cell is compared to a preset voltage range at step 470 to determine if the battery cell 12 is under voltage (below a lower limit of the present voltage range). If yes, the battery cell 12 is placed in time out mode and stops discharging (if discharging was initiated) in step 450. After a pre-determined time interval, the process is repeated at step 410 to start equalization, as described in method. If the measured voltage is higher than the preset voltage value, the battery cell 12 starts discharging at step 480. After discharging for a pre-set amount of time, the process goes back to step 410 and start equalization at step 420, as described in method 300.

In some embodiments, the method 400 resumes until all battery cells are discharged to a level that the battery pack 10 can no longer provide discharge to the load 34. In some embodiments, the method 400 may also be implemented with battery cell temperature 430 being constantly monitored and compared to the preset temperature range. In some embodiments, the method 400 resumes and assigns each under voltage cell at step 470 to be fully discharged and continue method 400 until all cells are considered depleted and fully discharged. In some embodiments, method 400 continues in parallel as method 300 to ensure all cells depletes at the same time.

The advantages of the present invention include without limitation, the ability to increase battery life, increase battery performance, increase discharge time, increase safety and prevent battery fires. This capability is crucial for commercial and industrial battery packs where storage is in the Kilo Watt Hour (KWh) range.

It would be desirable to apply such an intelligent battery optimization, equalization management system in various fields such being utilized as a charging station for electric vehicle charging, backup power sources, time of use power sources utilizing lower utility cost during the night and using this stored energy during the day at peak hours for industrial, commercial and residential purposes.

A charging station for electric vehicles is a crucial element in an infrastructure that supplies electrical energy for the recharging of, but not limited to plug-in electric vehicles, battery electric vehicles, neighborhood electric vehicles and plug-in hybrid electric vehicles.

Charging stations for electric vehicles in developed countries may not need new infrastructure. The charging stations can utilize the existing electrical grid and the residential infrastructure is capable of handling the load of an electric vehicle. The requirements for the installation of an electric vehicle charger for commercial and industrial areas are enough room to position the charger, transformer, and enough room to park the electric vehicle for charging. For residential areas the electric vehicle owner simply needs a garage or parking area with access to 220 volt or 110 volt, where an Electric Vehicle Supply Equipment can obtain power.

In order to offer charging for electric vehicles in commercial areas the business owner will have to purchase electric vehicle chargers and pay for the installation of the charger on the property. Depending on the existing wiring for the business, the cost can be very significant and does not justify for a business case with high enough return to break even or profitable to support electric vehicles.

In residential areas where single family dwellings are not available and most residents reside in high rise skyscrapers, the electric vehicle owner will not be able to recharge the electric vehicle with convenience. One of the few practical options would be to utilize public charging stations. However, in metropolitan areas public charging stations close to residential areas will be difficult to find. Without the coverage of electric vehicle charge stations and the inability to charge at home for metropolitan areas the demand for electric vehicles will dramatically decrease.

A mobile charging apparatus for electric vehicles provides the convenience, mobility and support of charging electric vehicles without the power grid infrastructure, the installation of electric vehicle chargers and the limited availability of electric vehicle charge stations.

The mobile charging apparatus may receive electrical energy from the power grid and store the electricity into the on board battery pack, then transfer the stored energy from the on board battery pack to the electric vehicle. The on-board battery pack may comprise a plurality of battery cells for desired energy storage and voltage specification in vehicle charging. The aforementioned battery management system may be perfectly applied for such application by ensuring each individual battery cell charged equally and monitoring each battery cell during the whole charge and discharge cycle.

In one embodiment, the system management unit is the main controller, containing all software, firmware, signals processing, emergency shut off, payment, sales, and usage information. The communication array receives data from the system management unit and the electrical vehicle, the communication array also provides GPS information and provides charging, sales, payment, usage information to the back end office or the end user.

In one embodiment, the charging apparatus may also work in reverse during a power outage or power failure, where it can provide electricity back to the power grid, residence or commercial building. When operating in reverse the apparatus can provide power from its internal batteries, or receive electricity from the electric vehicle and to act as a backup generator.

The mobile charging apparatus provides charging to the electric vehicle without the electric vehicle charging infrastructure in place. The electric vehicle can be recharged anywhere with access to the power grid and saves on the cost and installation time for putting in the charging infrastructure.

Figure 6:
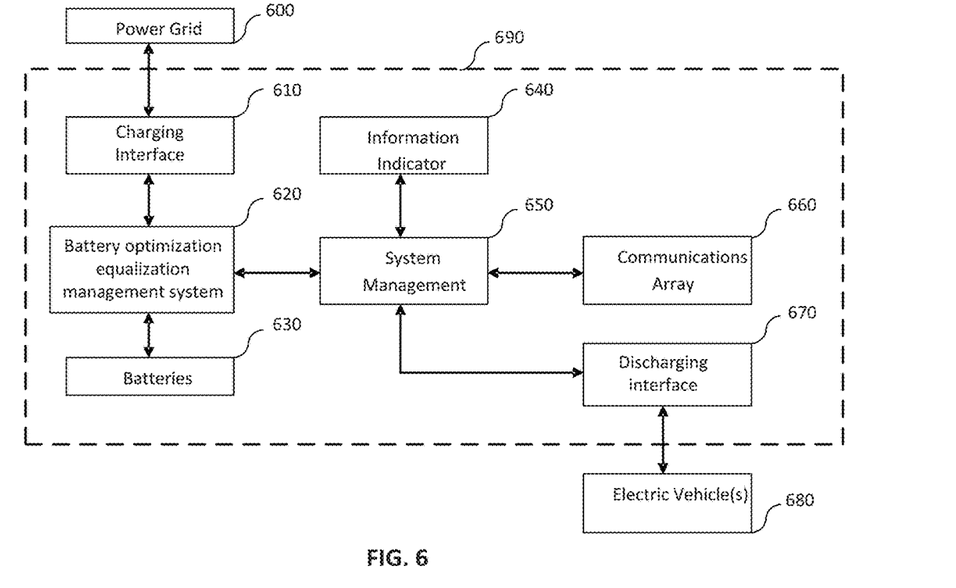
FIG. 6 shows a block diagram of a battery optimization, equalization management system (BOEMS) for a rechargeable battery pack used for a mobile charging apparatus for electric vehicles.

FIG. 6 shows a block diagram of a battery optimization, equalization management system (BOEMS) for a rechargeable battery pack used for a mobile charging apparatus for a load such as electric vehicles. The mobile charging apparatus 690 for electric vehicles where the charging infrastructure is not available or a range extension for the electric vehicle 680 is needed. The system may receive electricity from the power grid 600 and connect to the mobile charging apparatus 690 thru a charging interface 610 via a cable or connection to the AC outlet tied to an electric power source such as power grid 600 or an electric charger tied to the power grid 600. The system may comprise an on board battery optimization equalization management system 620 that monitors the electricity from the charging interface 610, monitors the batteries 630 that stores the electric charge and may convert the AC input from the charging interface 610 to DC to be stored into the batteries 630. The size and storage capacity of the batteries 630 varies depending on the storage capacity, material of the batteries 630 and charge rate needed to the electric vehicles 680. In some embodiments, the batteries 630 is a battery pack comprising a plurality of battery cells. The battery cells may be connected in parallel, series or a combination of both. The battery pack is also detachable, which can be replaceable or interchangeable with other battery packs such as a residential unit that can provide energy to the residence.

The battery optimization equalization management system 620 also connects and communicates with the system management 650 where the mobile charging apparatus 690 is being controlled. The system management 650 starts and stops the mobile charging apparatus 690, processes all signals, commands, and communicates with the electric vehicle 680 thru the discharging interface 670. The system management 650 may control an information indicator 640 and communications array 660. The information indicator 640 is primarily used to display information and may receive user commands. The information displayed may consist of information about the batteries 630, charge and discharge rate, temperature, point of sale information and may include a LCD, LED, touch screen, buttons, switches or other interface devices. The communications array 660 contains hardware and software used to transmit and receive information. This information may include GPS location, cellular signals, usage information, point of sale information, and information related to the function of the invention. The system management 650 sends and receives information from the discharging interface 670 and controls the power flow from the batteries 630 to the discharging interface 670 where the power flows to the electric vehicles 680. The discharging interface 670 may consist of a cable or connector to the electric vehicle 680, can transmit or receive power and signals from the electric vehicle 680.

In operation, the mobile charging apparatus 690 is charged first with the power from the power grid 600. The end user connects the mobile charging apparatus 690 to the power grid 600 through the interface to power grid 610 with the usage of a cable or a charger. The battery optimization equalization management system 620 receives the electricity from the interface to power grid 610 and transmits the electricity to the batteries 630 if the incoming voltage is DC; or first converts the electricity to DC if the electricity from the interface to power grid 610 is AC. During the whole charge and discharge process, the battery management system 620 monitors the batteries 630 and provides information to the system management 650. The system management 650 transmits all the information related to the function, battery status and point of sale information to the information indicator 640, where the end user can see the status of the charge or if there is an error or warnings. The system management 650 also sends data to the communications array 660, where the end user may receive information on their computer or mobile device. In the event of a sale, the communications array 660 is capable of transmitting and receiving the point of sale information to complete a transaction between the end users credit card and the provider. The system management 650 communicates with the electric vehicle 680 thru the discharging interface 670 and controls the start/stop of the flow of electricity from the batteries 630 to the electric vehicle 680.

The aforementioned battery optimization, equalization management system (BOEMS) as described in FIGS. 1-5 may be applied to the battery management system 620 for optimization, equalization of the battery cells within the batteries 630.

In some embodiment, the mobile charging apparatus 690 is big enough to contain batteries 630 that are capable of storing enough electricity to charge or extend the range of an electric vehicle 680. The mobile charging apparatus 690 may have enough room internally to house the system management 650, communications array 660, battery management system 620 and additional space to cool the batteries 630. In some embodiment, the mobile charging apparatus can be used as an energy storage and energy source for residential, commercial and industrial applications. Where the batteries 630 are interchangeable and detachable to increase or decrease the storage capability as needed for each application.

Figure 7:
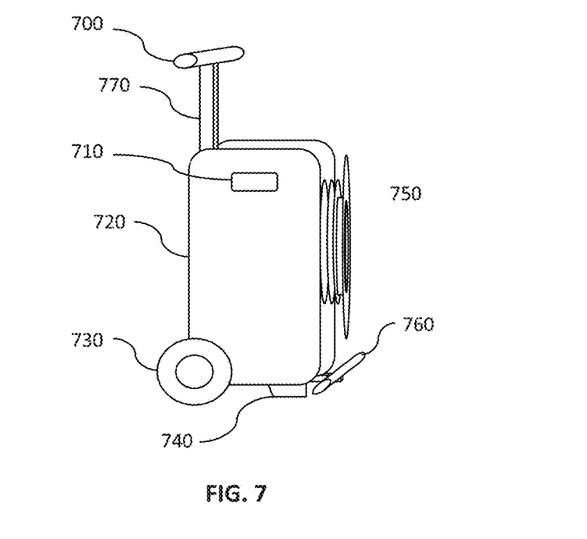
FIG. 7 is a perspective view of a mobile charging apparatus in accordance with an embodiment of the present invention.
Figure 8:
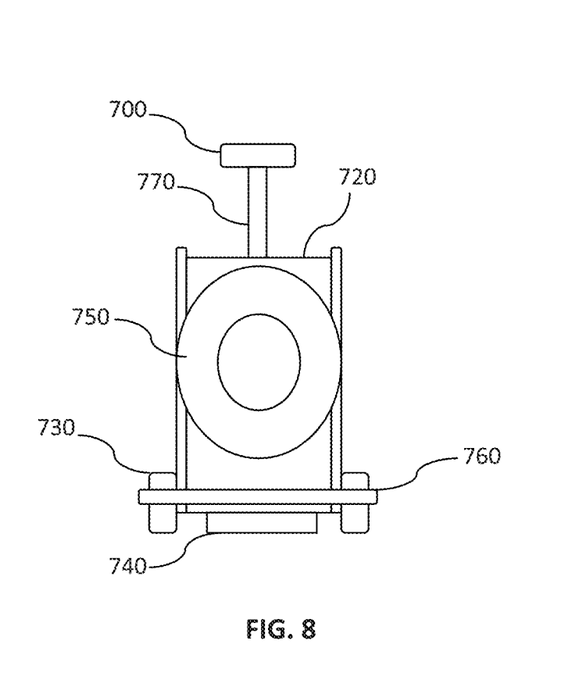
FIG. 8 is a front view of a mobile charging apparatus of FIG. 7.

FIG. 7 is a perspective view of a mobile charging apparatus in accordance with an embodiment of the present invention. FIG. 8 is a front view of a mobile charging apparatus of FIG. 7.

Referring now to FIG. 7 and FIG. 8, there is shown a perspective view of a mobile charging apparatus 720 from the side and from the front respectively. The mobile charging apparatus 720 is shown to stand upright, supported by a set of wheels 730 and a horizontal stopper 740. The wheels 730 are used to help transport the mobile charging apparatus 720 to the electric vehicle and to be charged off of the power grid. The horizontal stopper 740 is used to help the mobile charging apparatus 720 to stand upright. The bump protection 760 is used to protect the mobile charging apparatus 720 and the electric vehicle during transportation and moving into position to charge the electric vehicle. Information indicator 710 is positioned on the housing of the mobile charging apparatus 720 to display information and receive commands from the end user. Interface to electric vehicle 750 is shown to be a cable coil to connect with the electric vehicle. The coil can be wrapped around and stored with the mobile charging apparatus 720. To easy the movement of transporting the mobile charging apparatus 720, extension bar 770 and extendable handle 700 is attached to the mobile charging apparatus 720.

The construction details of the invention as shown in FIG. 7 and FIG. 8, are that the mobile charging apparatus 720 can have an outer housing made of plastic or any other sufficiently rigid and strong material such as high-strength plastic, metal, wood, and the like. The batteries within the mobile charging apparatus can be of any high efficiency battery storage material, which can provide enough stored electricity to provide a charge to the electric vehicle.

The advantages of the present invention include, without limitation, the portability to provide power to an electric vehicle with the electricity from the power grid and to extend the range of an electric vehicle. This capability is crucial for areas without electric vehicle charging infrastructure and without the private parking of a single family dwelling. The present invention is also capable of acting as an energy storage device and provide power to businesses, residences and industrial sites. With removable battery packs to be shared with portable battery packs used to charge electric vehicles.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A battery management system to provide optimization and equalization management for a battery containing a plurality of individual battery cells, the system comprising:
    a plurality of battery cell controllers, each comprising a controllable switch, with each battery cell controller electrically and conductively coupled to an individual battery cell via the controllable switch;

a master controller, electrically and conductively coupled to each of the plurality of battery cell controllers, for supplying a charging current to the plurality of individual battery cells via the plurality of battery cell controllers, wherein each battery cell controller measures a charge level of the individual battery cell to which it is coupled and transmits said measures to the master controller, wherein if the master controller determines that the individual battery cell is at full capacity based on the charge level, then the charging current is shunted away from the individual battery cell or a trickle charging is provided to the individual battery cell to maintain the charge level at full capacity, wherein the trickle charging is implemented by controlling an ON/OFF duty cycle of the controllable switch to supply a desired trickle charging current to the individual battery cell determined to be at full capacity.

2. The battery management system of claim 1 wherein the individual battery cell is a Lithium battery cell, Lithium-ion battery cell, Lithium polymer battery cell, electrolytic battery cell, or electrochemical battery cell.

3. The battery management system of claim 1 wherein the individual battery cell is a cell package comprising multiple battery elements.

4. The battery management system of claim 1 wherein the master controller receives an input from each battery cell controller and generates an output for each battery cell controller based at least on the input from each battery cell controller, wherein the input from each battery cell controller comprises at least one of a voltage across the electrically and conductively coupled individual battery cell, a current through the electrically and conductively coupled individual battery cell and a temperature of the electrically and conductively coupled individual battery cell.

5. The battery management system of claim 4 wherein the master controller generates an output for each battery cell controller based on a comparison between the voltage across each electrically and conductively coupled individual battery cell and a first voltage range.

6. The battery management system of claim 4 wherein the master controller generates an output for each battery cell controller based on a comparison between the temperature of the electrically and conductively coupled individual battery cell and a temperature range.

7. The battery management system of claim 4 wherein the master controller generates an output for each battery cell controller further based on a comparison between the voltages across each individual battery cell and an average voltage of the plurality battery cells.

8. A rechargeable battery pack comprising:
a plurality of individual battery cells;
a plurality of battery cell controllers, each comprising a controllable switch, wherein each battery cell controller is electrically and conductively coupled to an individual battery cell via the controllable switch;

a master controller, electrically and conductively coupled to each of the plurality of battery cell controllers, for supplying a charging current to the plurality of individual battery cells via the plurality of battery cell controllers, wherein each battery cell controller measures a charge level of the individual battery cell to which it is coupled and transmits said measures to the master controller, wherein if the master controller determines that the individual battery cell is at full capacity based on the charge level, then the charging current is shunted away from the individual battery cell or a trickle charging is provided to the individual battery cell, via the battery cell controller, to maintain the charge level at full capacity, wherein the trickle charging is implemented by controlling an ON/OFF duty cycle of the controllable switch to supply a desired trickle charging current to the individual battery cell determined to be at full capacity.

9. The rechargeable battery pack of claim 8 wherein the master controller receives an input from each battery cell controller and generates an output for each battery cell controller based at least on the input from each battery cell controller, wherein the input from each battery cell controller comprises at least one of a voltage across the electrically and conductively coupled individual battery cell, a current through the electrically and conductively coupled individual battery cell and a temperature of the electrically and conductively coupled individual battery cell.

10. The battery management system of claim 1, wherein the charging current is shunted away from the individual battery cell determined to be at full capacity by switching OFF the controllable switch coupled to the individual battery cell determined to be at full capacity.

11. The battery management system of claim 1, wherein when the plurality of battery cells is not at full capacity, being charged, or discharging, the mater controller communicates with each battery cell controller to perform equalization of the charge level of the plurality of battery cells to a common charge level, wherein trickle charging maintains the charge level of each battery cell at the common charge level.

12. The rechargeable battery pack of claim 8, wherein the charging current is shunted away from the individual battery cell determined to be at full capacity by switching OFF the controllable switch coupled to the individual battery cell determined to be at full capacity.

13. The battery management system of claim 8, wherein when the plurality of battery cells is not at full capacity, being charged, or discharging, the mater controller communicates with each battery cell controller to perform equalization of the charge level of the plurality of battery cells to a common charge level, wherein trickle charging maintains the charge level of each battery cell at the common charge level.

* * * * *